United States Patent [19]

Umehara

[11] Patent Number: 4,850,621
[45] Date of Patent: Jul. 25, 1989

[54] STRUCTURE HAVING INTERCONNECTED METAL TUBES

[75] Inventor: Kazumasa Umehara, Shizuoka, Japan

[73] Assignee: Usui Kokusai Sangyo Kabushiki Kaisha, Shizuoka, Japan

[21] Appl. No.: 171,651

[22] Filed: Mar. 22, 1988

[51] Int. Cl.⁴ .............................................. F16L 21/06
[52] U.S. Cl. ...................... 285/322; 29/450; 29/451; 29/510; 29/516; 285/382; 285/420; 285/918
[58] Field of Search ............ 29/516, 526 R, 451, 29/450, 510; 285/322, 345, 337, 365, 382, 403, 420, 918

[56] References Cited

U.S. PATENT DOCUMENTS

| 1,678,640 | 7/1928 | Hall | 285/382.2 |
| 2,413,730 | 1/1947 | Samjran | 285/918 X |
| 2,457,105 | 12/1948 | Patterson | 285/322 |
| 2,574,625 | 11/1951 | Coss | 285/382 X |
| 2,702,716 | 2/1955 | Basolo et al. | 285/322 |
| 4,113,289 | 9/1978 | Wagner et al. | 285/382 X |

FOREIGN PATENT DOCUMENTS 7416024 6/1975 Netherlands ...................... 285/382

Primary Examiner—Charlie T. Moon
Attorney, Agent, or Firm—Anthony J. Casella; Gerald E. Hespos

[57] ABSTRACT

A structure comprising two interconnected metal tubes used for supplying oil or air. The first tube inserted in the second tube has a tubular wall at its one end and an outwardly swelling circumferential wall formed inside the tubular wall. The second tube has plural slots arranged circumferentially. A seal member is sandwiched between both tubes. A binding band is wound around the slots to compress the portion having the slots, for fastening the tubes together.

8 Claims, 2 Drawing Sheets

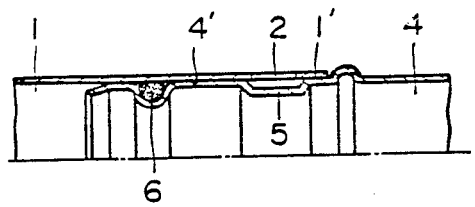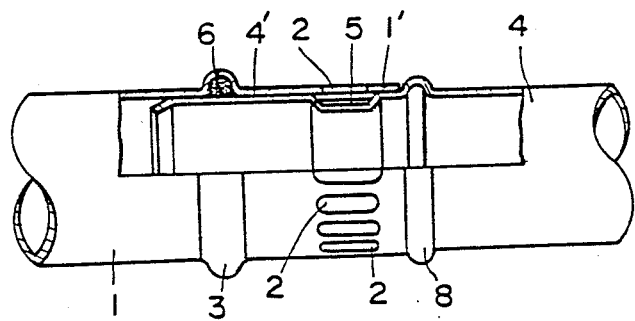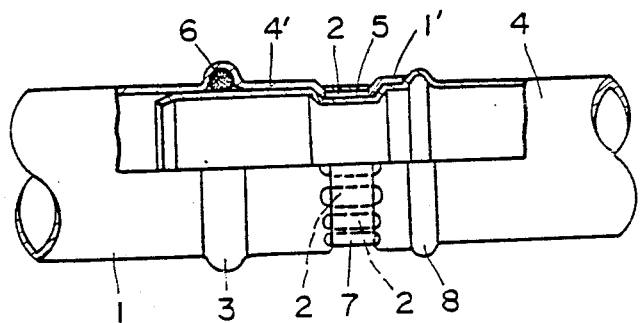

PRIOR ART

STRUCTURE HAVING INTERCONNECTED METAL TUBES

BACKGROUND OF THE INVENTION

1. Field of the Invention

The present invention relates to metal tubes disposed in automobiles, machines, equipment, devices, or the like to supply air or oil and, more particularly, to a structure in which metal tubes as described above are interconnected at their ends.

2. Description of the Prior Art

A conventional structure of this kind is shown in FIG. 5, where one tube 11 has a plurality of slits 12 at its one fringe. A circumferential recess 13 is formed in the tube 11 inside the slits 12. One end portion of another tube 14 is inserted in one end portion of the tube 11. A seal member 16 is fitted in the recess 13 so as to cover the outer periphery 15 of the tube 14. A band 17 is mounted over the slits 12 to tighten the portion having the slits 12, for fastening both tubes together.

The prior art structure constructed as described above is mounted in an engine, machine, equipment, device, or the like and subjected to vibration. Therefore, the band 17 is often shifted out of position. Then, the binding effect of the band weakens, deteriorating the interconnection.

SUMMARY OF THE INVENTION

It is an object of the present invention to provide a structure in which two metal tubes are interconnected at their ends using a binding band with a small force without creating the possibility that the band is shifted out of position or loosened when the structure is subjected to vibration, whereby the interconnection can be certainly maintained for a long term.

The present invention lies in a structure in which one end portion of a first metal tube is inserted in a second metal tube having slots arranged circumferentially, the first tube having a tubular wall at its one end. The first tube also has an outwardly swelling circumferential wall inside the tubular wall as viewed along the axis of the tube. The second tube engages the circumferential wall either at its one end or at a step portion of an enlarged wall portion formed at the end. The portion having the slots is compressed to press this portion either into the circumferential groove in the first tube or against the circumferential wall. A seal member is sandwiched between both tubes.

The novel structure is constructed as described above, and the second tube is inserted in the first tube such that their end portions overlap. The portion of the first tube which has the slots is placed over the groove or the enlarged wall portion. This portion is compressed by a binding band or the like to press this portion either into the groove or against the swelling wall. Instead of using the band, the two tubes may be fastened together by applying an external force to tighten them radially.

BRIEF DESCRIPTION OF THE DRAWINGS

FIG. 1 is a partially cutaway side elevation of a structure in whih metal tubes are interconnected at their ends in accordance with the invention, and in which the tubes are not yet deformed;

FIG. 1A is a fragmentary view similar to a part of FIG. 1, but showing another structure;

FIG. 2 is a view similar to FIG. 1, but in which the tubes have been tightened;

DETAILED DESCRIPTION OF THE PREFERRED EMBODIMENTS

Figure 3A:
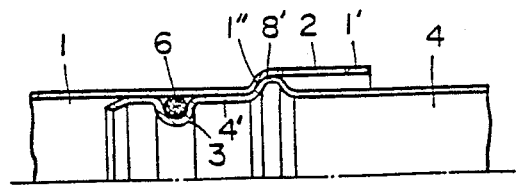
FIG. 3A is a view similar to FIG. 1, but showing a yet other structure.

FIGS. 1-4 show structures according to the invention. It is to be noted that like components are denoted by like reference numerals throughout these figures.

Referring to FIGS. 1 and 2, one tube 1 has an unworked wall portion 1' at its one end. A plurality of slots 2 are formed in the tube 1 circumferentially. A circumferential recessed portion 3 that swells outward is formed in the tube 1 inside the slots 2 as viewed along the axis of the tube. Another tube 4 also has a tubular wall 4' at its one end. A circumferential groove 5 is formed in the tube 4 inside the wall 4'. An outwardly swelling and circumferentially extending stopper wall 8 is formed also inside the wall 4'. One end portion of the tube 4 is inserted in one end portion of the tube 1. A seal member 6 is fitted in the recessed portion 3 in the tube 1 so as to cover the wall 4' of the tube 4. The seal member 6 is made of rubber, a resin, or other material, and acts to seal the tubes 1 and 4 against each other. In the condition shown in FIGS. 1 and 2, the slots 2 in the tube 1 are aligned with the groove 5. A band 7 is attached to the outside of the slots 2 to compress this portion. Also, the band 7 is pressed into the groove 5 to fasten the tubes together.

Referring next to FIG. 1A, a circumferential groove 3 is formed in the wall 4' of the tube 4. A seal member 6 is fitted in the groove 3. The seal member 6 is pressed against the inner surface of the tube 1 to seal this portion in the same manner as in the structure shown in FIG. 1.

Figure 3:
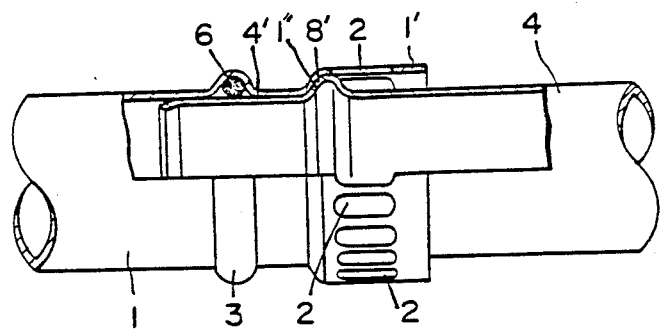
FIG. 3 is a view similar to FIG. 1, but showing a further structure.
Figure 4:
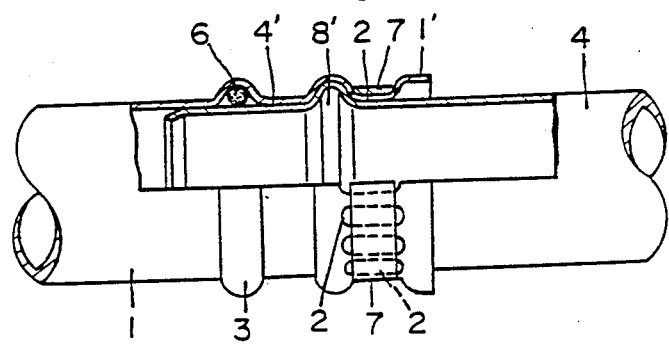
FIG. 4 is a view similar to FIG. 3, but in which the tubes have been tightened.
Figure 5:
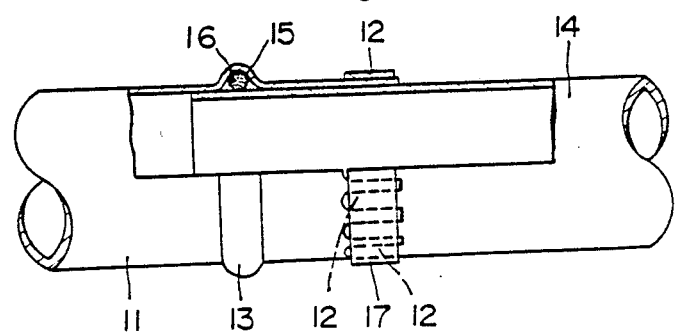
FIG. 5 is a partially cutaway side elevation of a conventional structure comprising interconnected tubes.

Referring to FIGS. 3 and 4, there is shown a structure similar to the structures already described except for the following. The tube 4 is not provided with the circumferential groove 5 and so the tubular wall 4' is unworked. An enlarged wall portion 1' having a step portion 1'' is formed at the end of the other tube 1. The step 1'' engages the outwardly swelling circumferential wall 8' of the tube 4.

This structure is assembled in the manner described now. One tube 4 is inserted into the other tube 1 in such a manner that the step portion 1'' engages the swelling wall 8'. Then the band 7 is wound around the slots 2 to tighten this portion from outside. The portions of the tubes which surround the swelling wall 8' are compressed to fasten both tubes together.

Referring to FIG. 3A, a circumferential recess 3 is formed in the curved wall of the tube 4 so as to surround the wall in the same way as in the structure shown in FIG. 1. A seal member 6 is fitted in this recess 3. The seal member is pressed against the inner surface of the tube 1 in the same way as in the structure shown in FIG. 1.

In the novel structure consisting of interconnected metal tubes, the binding band 7 is pressed into the groove 5 or around the swelling wall 8' to compress the portion of the tube 1 which has slots 2. Thus, the tube 1 can be coupled to the tube 4 with a small force. If this structure is subjected to vibration, it is unlikely that the band 7 shifts out of position or loosens due to such a shift. The interconnection can be retained with certainty for a long term.

What is claimed is:

1. A structure comprising:
   a first tube having a substantially cylindrical portion generally adjacent one axial end, an outwardly extending circumferential stopper wall spaced from said end and an inwardly directed circumferential groove intermediate said stopper wall and said cylindrical portion;
   a second tube slidably disposed over the end portion of said first tube, said second tube having an axial end in abutting relationship with the stopper wall of said first tube, a plurality of spaced apart slits formed in said second tube and defining a circumferentially array of slits thereabout, the array of slits in said second tube being aligned with the inwardly directed groove of said first tube, portions of said second tube intermediate the slits therein being deformed inwardly and engaging the inwardly directed groove of said first tube;
   a generally annular seal disposed intermediate the second tube and the cylindrical portion of the first tube; and
   a circumferentially extending fastening means engaging the inwardly deformed portion of said second tube, whereby the slits in said second tube enable the fastening means to deform the second tube inwardly into the groove of said first tube for securely fastening said first and second tubes together.

2. A structure as in claim 1 wherein the inwardly directed groove of said first tube is spaced from both the stopper wall and the end of said first tube, and wherein the slots of said second tube are spaced from the end thereof.

3. A structure as in claim 2 wherein the slots are generally axially aligned and generally parallel to one another.

4. A structure as in claim 1 wherein the second tube includes an outwardly extending seal recess aligned with the cylindrical portion of the first tube, said seal being retained in the seal recess.

5. A structure as in claim 1 wherein the first tube includes an inwardly extending seal recess formed in the cylindrical portion thereof, said seal being retained in the seal recess.

6. A structure comprising:
   a first tube of generally uniform thickness and comprising a substantially cylindrical wall portion extending from an axial end thereof, an outwardly extending stopper wall spaced from said axial end, an inwardly directed circumferential groove spaced from said stopper wall and intermediate said stopper wall and the cylindrical wall portion;
   a second tube of generally uniform thickness circumferentially overlying the portion of said first tube between the axial end of said first tube and the stopper wall thereof, a plurality of slots formed through said second tube and spaced circumferentially thereabout at a location thereon spaced from the end of said second tube and generally in alignment with the inwardly directed groove of said first tube, portions of said second tube intermediate the slots being deformed inwardly into engagement with the inwardly directed groove of said first tube;
   a seal disposed between the first and second tubes at a location along the first tube intermediate the end thereof and the inwardly directed groove therein; and
   a circumferential fastening means engaging the inwardly deformed portions of said second tube intermediate the slots therein, whereby the portions of the second tube intermediate the slots are deformed inwardly by the fastening means for securely holding the first and second tubes together.

7. A structure as in claim 6 wherein the first tube comprises an inwardly directed circumferential seal receiving recess, said seal receiving recess being disposed intermediate the end of said first tube and the groove thereof, said seal being retained in said recess.

8. A structure as in claim 6 wherein said second tube comprises an outwardly extending seal receiving recess formed therein at a location aligned with the cylindrical portion of said first tube, said seal being disposed in the outwardly extending seal receiving recess of said second tube.

* * * * *